United States Patent [19]
Brown et al.

[11] Patent Number: 5,867,701
[45] Date of Patent: *Feb. 2, 1999

[54] SYSTEM FOR INSERTING A SUPPLEMENTAL MICRO-OPERATION FLOW INTO A MACROINSTRUCTION-GENERATED MICRO-OPERATION FLOW

[75] Inventors: Gary L. Brown, Aloha; R. Guru Prasadh, Hillsboro, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 937,097

[22] Filed: Sep. 24, 1997

Related U.S. Application Data

[63] Continuation of Ser. No. 489,221, Jun. 12, 1995, abandoned.

[51] Int. Cl.$^6$ .................................................. G06F 3/00
[52] U.S. Cl. ........................................ 395/598; 395/590
[58] Field of Search ................................ 395/598, 590

[56] References Cited

U.S. PATENT DOCUMENTS

| | | | |
|---|---|---|---|
| 3,911,406 | 10/1975 | McLaughlin et al. | 340/172.5 |
| 4,038,533 | 7/1977 | Dummermuth et al. | 235/151.11 |
| 4,050,058 | 9/1977 | Garlic | 364/200 |
| 4,199,811 | 4/1980 | Borgerson et al. | 364/200 |
| 4,342,078 | 7/1982 | Tredennick et al. | 364/200 |
| 4,363,091 | 12/1982 | Pohlman, III et al. | 364/200 |
| 4,376,976 | 3/1983 | Lahti et al. | 364/200 |
| 4,422,144 | 12/1983 | Johnson et al. | 395/375 |
| 4,542,453 | 9/1985 | Patrick et al. | 364/200 |
| 4,610,000 | 9/1986 | Lee | 365/189 |
| 4,654,781 | 3/1987 | Schwartz et al. | 364/200 |
| 4,751,703 | 6/1988 | Picon et al. | 371/10 |
| 4,875,160 | 10/1989 | Brown, III | 364/200 |
| 4,965,724 | 10/1990 | Utsumi et al. | 395/375 |
| 5,003,462 | 3/1991 | Blaner et al. | 395/375 |
| 5,005,118 | 4/1991 | Lenoski | 364/200 |
| 5,101,344 | 3/1992 | Bonet et al. | 395/375 |
| 5,129,067 | 7/1992 | Johnson | 395/375 |
| 5,134,701 | 7/1992 | Mueller et al. | 395/500 |
| 5,168,571 | 12/1992 | Hoover et al. | 395/800 |
| 5,202,967 | 4/1993 | Matsuzaki et al. | 395/375 |
| 5,210,758 | 5/1993 | Gomez | 371/16.1 |
| 5,212,693 | 5/1993 | Choa et al. | 371/10.1 |
| 5,233,694 | 8/1993 | Hotta et al. | 395/375 |
| 5,235,686 | 8/1993 | Bosshart | 395/375 |
| 5,293,592 | 3/1994 | Fu et al. | 395/375 |
| 5,307,478 | 4/1994 | Rasbold et al. | 395/500 |
| 5,335,344 | 8/1994 | Hastings | 395/575 |
| 5,371,864 | 12/1994 | Chuang | 395/375 |
| 5,452,426 | 9/1995 | Papworth et al. | 395/375 |
| 5,463,745 | 10/1995 | Vidwans et al. | 395/375 |
| 5,542,059 | 7/1996 | Blomgren | 395/375 |
| 5,546,552 | 8/1996 | Coon et al. | 395/375 |

OTHER PUBLICATIONS

Moudgill, Mayan. "Precise Interrupts", IEEE Micro, pp. 58–67, Feb. 1996.

–Val Popescu et al., "The Metaflow Architecture," IEEE Micro, pp. 10–13 and 63–73 (Jun. 1991).

*Primary Examiner*—Robert B. Harrell
*Assistant Examiner*—David M. Oredovitz
*Attorney, Agent, or Firm*—Blakely, Sokoloff, Taylor & Zafman LLP

[57] ABSTRACT

A system for inserting a supplemental micro-operation sequence into a macroinstruction-generated micro-operation flow provides a versatile, flexible mechanism for early pipeline stages of a microprocessor to pass control signals, data, and other information to later pipeline stages. The mechanism is useful to maintain precise timing of a fault model in pipelined processors. A method includes the step of detecting the occurrence of a predetermined uop-inserting event and, responsive thereto, generating a control signal to a uop insertion unit. Responsive thereto, the uop insertion unit supplies signals to a decoder which, responsive thereto, decodes the signal encoded within the signal to provide the inserted uop sequence, which is inserted in a position within the macroinstruction-generated micro-operation flow predetermined by the uop-inserting event.

14 Claims, 5 Drawing Sheets

SYSTEM FOR INSERTING A SUPPLEMENTAL MICRO-OPERATION FLOW INTO A MACROINSTRUCTION-GENERATED MICRO-OPERATION FLOW

This is a continuation of application Ser. No. 08/489,221, filed Jun. 12, 1995, now abandoned.

CROSS-REFERENCE TO RELATED APPLICATIONS

Cross-reference is made to the following commonly assigned copending patent applications:

Ser. No. 08/204,593, now U.S. Pat. No. 5,537,629, entitled "A Decoder for Single Cycle Decoding of Single Prefixes in Variable Length Instructions", filed Mar. 1, 1994, by Brown et al.;

Ser. No. 08/204,600, entitled "A Decoder Having Independently Loaded Alias Registers Accessible Simultaneously by One Micro-operation", filed Mar. 1, 1994, by Boggs et al.;

Ser. No. 08/204,602, entitled "A Decoder for Decoding Multiple Instructions in Parallel", filed Mar. 1, 1994, by Brown et al.;

Ser. No. 08/204,744, now U.S. Pat. No. 5,566,298, entitled "A Method for State Recovery During Assist and Restart in a Decoder Having an Alias Mechanism", filed Mar. 1, 1994, by Boggs et al.;

Ser. No. 08/204,862, now U.S. Pat. No. 5,600,806, entitled "A Method and Apparatus for Aligning an Instruction Boundary in Variable Length Macroinstructions with an Instruction Buffer", filed Mar. 1, 1994, by Brown et al.;

Ser. No. 08/204,601, entitled "A Method for Steering Multiple Variable Length Instructions from an Instruction Buffer to Multiple Decoders", filed Mar. 1, 1994, by Brown et al.;

Ser. No. 08/205,022, now U.S. Pat. No. 5,608,885, entitled "Dual Instruction Buffers with a Bypass Bus and Rotator for a Decoder of Multiple Instructions of Variable Length", filed Mar. 1, 1994, by Gupta et.; and Ser. No. 08/316,208, now U.S. Pat. No. 5,758,116, entitled "An Instruction Length Decoder for Variable Length Instructions", filed Sep. 30, 1994, by Lee et al., all of which are incorporated by reference herein.

BACKGROUND OF THE INVENTION

1. Field of the Invention

The present invention relates to decoders for processors that have pipelined decoders and execution units.

2. Description of the Related Art

Driven by demand for faster processors, microprocessor manufacturers are continually developing new designs. Each new processor usually provides better performance (i.e., it must be faster than previous processors), introduces new capabilities or expands upon pre-existing capabilities and/or has reduced cost. Furthermore it is preferable that the new processor support all previously-supported instructions for that type of processor. Compatibility is an extremely valuable characteristic, for without software a new processor would not be immediately useful.

In order to increase processing speed of computer processors, "pipelined" structures have been developed. A pipelined computer processor includes a plurality of stages that operate independently of each other. When a first instruction has completed execution in one of the pipeline stages, the instruction moves on to the next stage, and a second instruction moves into the stage vacated by the first instruction. Processing speed is increased because multiple instructions are processed simultaneously in different stages of the pipeline. For example, a ten-stage pipeline can simultaneously process ten instructions in ten separate stages. In order to further increase processing speed, processors termed "superscalar" processors have been designed with multiple pipelines that process instructions simultaneously when adjacent instructions have no data dependencies between them. Even greater parallelism and higher performance can be provided by an out-of-order processor that includes multiple parallel units, in which instructions are processed in parallel in any efficient order that takes advantage of whatever opportunities for parallel processing may be provided by the instruction code.

As pipelines increase in complexity, it is has become increasingly difficult for the early stages (sometimes referred to as the "front-end") to communicate with the later stages (sometimes referred to as the "back-end"). The front-end may include stages such as instruction fetch and decode stage, and the back-end may include execution stages and retirement stages. It would be useful to have a mechanism that allows the front-end to communicate with the back-end in an efficient and precise manner.

Precise timing of the communication is of critical importance, particularly for microprocessors that-are designed for instruction sets in which precise timing of exceptions and other events is essential to preserve compatibility with previous processors. One example of an instruction set requiring precise fault timing is the well-established software written for the INTEL family of processors beginning with the 8086 and continuing with the 80286, i386™, 80486, and the Pentium™ processors. When introduced, the fault model of each of those processors was compatible with software written for previous models, so that the existing software base was fully usable. The term "INTEL instruction set" refers to software written for those processors.

As the INTEL instruction set developed, its capabilities expanded but so did its complexity. The INTEL instruction set is now very complex: it includes variable length instructions that may include prefixes, and a complex, segmented, paged memory management system. Designing a pipelined processor to handle all of these complex instructions, as well as dealing with faults, exceptions, cache misses, self-modifying code and other problems in a precise manner is becoming increasingly difficult.

It would be an advantage to provide a mechanism that a microprocessor designer could use to communicate between the front-end and back-end. Such a mechanism could handle a number of difficult problems that arise during decoding and later processing in the pipeline. For example, such a system could be useful to handle illegal opcodes, special instruction prefixes, code breakpoints, TLB faults, and self-modifying code while maintaining compatibility with the precise fault model of the INTEL instruction set. The flexibility afforded by such a tool could provide an efficient mechanism to ensure compatibility with previous processors.

SUMMARY OF THE INVENTION

The present invention provides a versatile, flexible mechanism for early pipeline stages (the "front-end") of a microprocessor to communicate with later pipeline stages (the "back-end"). Such a mechanism is useful to maintain the precise timing of the fault model in a pipelined processor. In order to provide these and other advantages, a method and apparatus for inserting a supplemental micro-operation sequence into a macroinstruction-generated micro-operation flow is provided.

A processor receives a macroinstruction sequence and decodes the sequence in a decoder into a macroinstruction-generated micro-operation flow. (A "micro-operation" may be abbreviated by "uop".) A method of inserting a uop sequence into the macroinstruction-generated uop flow at a precise location includes the steps of detecting the occurrence of a predetermined uop-inserting event that occurs during processing of the macroinstructions in the front-end and, responsive thereto, generating a control signal. One example of a uop-inserting event is a TLB page miss that is recognized in the fetch stage. Responsive to the control signal, a uop insertion unit supplies an forceuopvalid signal and an encoded signal indicative of a predetermined inserted uop sequence to a decoder. Responsive thereto, the encoded signal is decoded to provide the inserted uop sequence, which is then inserted at a predetermined position within the macroinstruction-generated uop flow.

DETAILED DESCRIPTON OF THE PREFERRED EMBODIMENT

Figure 1:
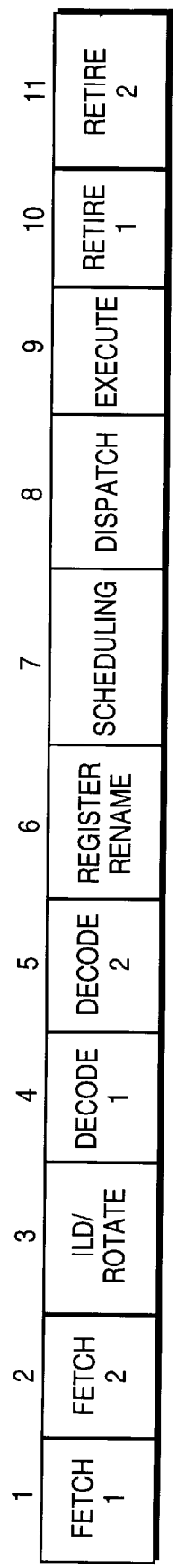
FIG. 1 is a diagram of an eleven-stage pipeline including an out-of-order execution section.

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Notation and Nomenclature

The following description may include specific numbers and quantities associated with the apparatus and method described therein. For example, the processing apparatus and methods described herein can be practiced in a single microprocessor chip, or multiple chips, or in software. The chips may be made of silicon or other semiconductor material. Also, it should be apparent to one skilled in the art that the numbers and quantities are utilized herein for illustrative purposes, for example the number of bits in a particular field can vary between embodiments.

The detailed descriptions which follow are sometimes presented in terms of display images, algorithms, and symbolic representations of operations of data bits within a computer memory. These algorithmic descriptions and representations are used by those skilled in the data processing arts to most effectively convey the substance of their work to others skilled in the art.

An algorithm is here, and generally, is conceived to be a self-consistent sequence of steps leading to a desired result. These steps are those requiring physical manipulations of physical quantities such as electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

Brief Description of An Instruction Set

The system described herein is particularly useful for inserting a supplemental micro-operation into a micro-operation flow that would otherwise be generated by decoding a sequence of instructions that form a portion of a computer program. In the preferred implementation, the instructions supplied to the decoder (termed "macroinstructions") have the well-known format of the INTEL instruction set which is described, for example, in detail in the *i486™ Programmers Reference Manual*, 1990, available from INTEL Corporation and the *Pentium™ Processor User's Manual*, Volume 3, 1994 also available from INTEL Corporation.

In the INTEL instruction format, a macroinstruction has a variable length up to fifteen bytes. Each macroinstruction includes at least one opcode byte, that specifies the operation performed by the instruction. There are predetermined format rules; for example, a macroinstruction is divided into sections that may include prefix bytes, followed by opcode bytes, which are followed by operand or other data bytes. The number of prefix bytes in a single macroinstruction may vary from zero to fourteen. The number of opcode bytes ranges from one to three, and the number of operand and other data bytes can vary from zero to eight.

Description of a Pipelined Processor

Reference is first made to FIG. 1, which illustrates a set of pipeline stages of a deeply pipelined processor that implements in-order decoding and out-of-order execution. The major pipeline stages illustrated in FIG. 1, such as fetch, decode, and execute, are divided into several pipeline substages, so that each major stage of the pipeline is itself pipelined. Eleven pipeline substages comprise a long pipeline by present day standards.

Located at the beginning of the instruction pipeline illustrated in FIG. 1 are two instruction fetch substages—Fetch 1 and Fetch 2. These two instruction fetch substages continually fetch new instructions to supply to the instruction pipeline. The fetch substages supply instructions to the third pipeline stage, which is an ILD/rotate stage, such as described in further detail in commonly assigned copending applications such as Ser. No. 08/204,601, entitled "A Method for Steering Multiple Variable Length Instructions from an Instruction Buffer to Multiple Decoders", filed Mar. 1, 1994, by Brown et al.; Ser. No. 08/205,022, entitled "Dual Instruction Buffers with a Bypass Bus and Rotator for a Decoder of Multiple Instructions of Variable Length", filed Mar. 1, 1994, by Gupta et al.; and Ser. No. 08/316,280, entitled "An Instruction Length Decoder for Variable Length Instructions", filed Sep. 30, 1994, by Lee et al. The ILD/rotate stage supplies instructions to a decoder stage that includes two substages—decode 1 and decode 2.

Microprocessors conventionally include a decoder to receive instructions from the fetch stage and decode the fetched instruction into a form, such as a micro-operation, that is suitable for execution. Simple instructions are usually decoded directly in a PLA, while more complex instructions are usually given an entry point into a microcode ROM that provides a series of micro-operations that could number in the hundreds.

Decoded macroinstructions are translated into a series of one or more micro-operations supplied to an execution stage that corresponds to pipeline substages six to nine, including a register renaming substage, a scheduling substage, a dispatch substage, and an execute substage. The executed instructions are then supplied to pipeline stages ten and eleven—the first retire and second retire substages—which retire the instructions in accordance with a predetermined algorithm.

Overview of a Pipelined Processing System

Figure 2:
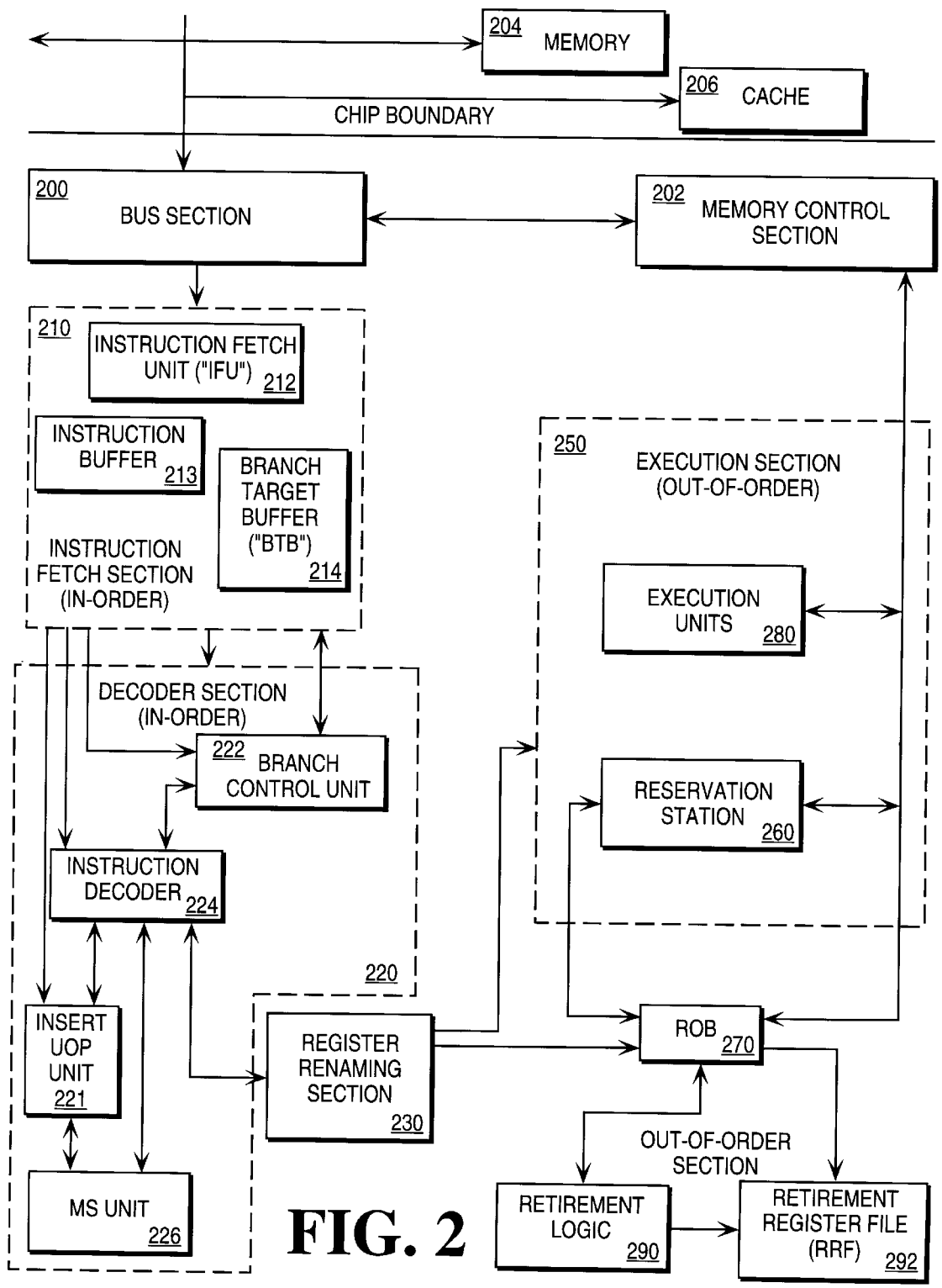
FIG. 2 is a block diagram of a processing system that implements in-order decoding and out-of-order execution.

Reference is now made to FIG. 2 which is a block diagram of a microprocessor that implements in-order fetch and decoder sections, and an out-of-order execution section. The blocks within the microprocessor chip include a bus section 200 and a memory control section 202 coupled thereto. A memory 204 and a cache 206 are coupled to the bus section 200. The memory control section 202 controls the bus section 200 to retrieve information from the memory 204 or the cache 206. The memory 204 includes any type of external memory, such as Random Access Memory ("RAM"), disk drives, or other storage media. The cache 206 is utilized to store frequently-used instructions or data. The cache 206 may be located on-chip or, as illustrated, off-chip.

The blocks within the chip also include an instruction fetch section 210 that utilizes the bus section to fetch instructions in sequential order (i.e., "in-order"). The instruction fetch section 210 includes an instruction fetch unit ("IFU") 212 to fetch blocks of macroinstructions and an instruction buffer 213 to hold the fixed-length block of macroinstructions until they can be supplied to the decoder. The instruction fetch section 210 also includes a branch target buffer ("BTB") 214 that operates with control logic to perform branch predictions. Any conventional branch prediction mechanism may be used. In one implementation, the branch prediction mechanism may include apparatus and methods described in a commonly assigned copending application, Ser. No. 08/062,057, entitled "Branch Target Buffer with Per-Set Pattern Table", by Bradley D. Hoyt et al., filed Jul. 15, 1993 and Ser. No. 08/062,012, entitled "Speculative History Mechanism in a Branch Target Buffer", by Bradley D. Hoyt et al., filed Jul. 15, 1993. The IFU 212 includes any conventional circuitry and control logic that retrieves data from memory 204 or the cache 206 via section 200. As defined herein, "information" includes instructions and other stored data.

A decoder section 220 includes an inserted uop unit 221 and a branch control unit 222 coupled to receive instructions from the instruction buffer in the instruction fetch section 210. The inserted uop 221, as will be discussed later in more detail, provides a way for the front-end (e.g., the IFU 210, and decoder section 220) to send information, data, and control signals (such as a uop) to later pipeline stages such as the execution and retirement units. Particularly, the inserted uop unit 221 receives signals indicative of predetermined conditions under which uops are to be inserted, and controls a decoder 224 to insert specified micro-operations at a specified position. The instruction decoder 224 is coupled to the branch control unit 222 and the instruction fetch section 210, to receive macroinstructions therefrom and decode them into a series of uops. The decoder 224 described herein is preferably designed to decode the INTEL instruction set, which includes instructions executable in the INTEL microprocessors including the 8086, 8087, 80286, i386™, 80287, i486™ and the Pentium™ microprocessors. It should be apparent however, that the structures described herein could also be used with instruction sets other than the INTEL instruction set.

The decoder 224 receives signals from the inserted uop unit 221 including encoded signals indicative of predetermined inserted uops and a forceuopvalid control signal that indicates whether to override the macroinstruction data bytes supplied to the decoder from the IFU 212, as will be described with reference to FIG. 4, for example. A MS unit 226, including a microcode sequencer and a microcode memory such as a ROM is coupled to an entry point PLA disposed within the decoder 224 to a receive an entry point therefrom. In response, the MS unit 226 can supply multiple micro-operations for long flows.

A register renaming section 230 is coupled to receive instructions from the instruction decoder 224. The register renaming section may include circuitry such as a register allocation table ("RAT"), and an allocator circuit. A function of the register renaming section 230 is to rename the registers specified by the instructions. Options for a register renaming section are discussed for example, in Chapter 6 of "Superscalar Microprocessor Design" by Mike Johnson, Prentice-Hall, Inc., Englewood Cliffs, N.J., 1991.

An out-of-order execution section 250 includes a reservation station 260 that is coupled to the register renaming section 230 to receive micro-operations therefrom, and a re-order buffer ("ROB") 270 that is also coupled to the register renaming section 230 to receive micro-operations therefrom. The execution units 280 include a plurality of execution units, such as an address generation unit ("AGU"), an integer execution unit ("IEU"), a floating point execution unit ("FEU"), and a memory interface unit ("MIU"). The execution units 280 are coupled to the memory control section 202, the reservation station 260, and the re-order buffer 270.

Retirement logic 290 is coupled to the ROB 270. A retirement register file ("RRF") is coupled to the retirement logic 290 and the ROB 270. When the retirement logic 290 determines that a uop that has an entry in the ROB 270 has completed execution and is ready to retire, it stores the information into the RRF 292. More details of one register renaming section 230, ROB 270, retirement logic 290, RRF 292, and related circuitry can be found in an application entitled, "Speculative and Committed Resource Files in an Out-of-Order Processor", Ser. No. 08/177,244, filed Jan. 4, 1994.

Description of Insertion Mechanism

Figure 3:
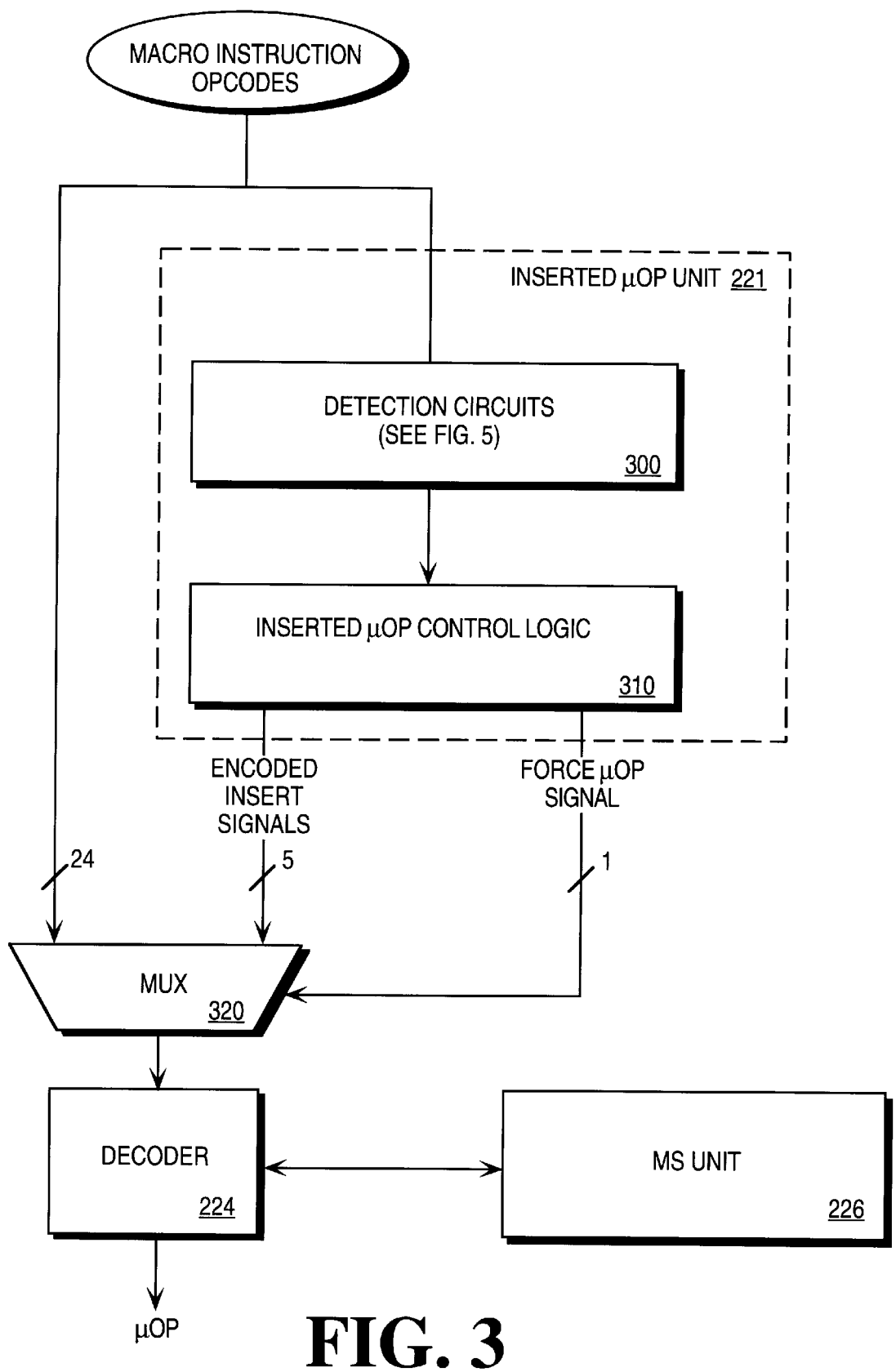
FIG. 3 is a block diagram of the inserted uop unit and a mechanism for inserting uops through a decoder.

Reference is now made to FIG. 3 to illustrate the circuits within the inserted uop unit 221. A plurality of detection circuits 300 are provided to detect predetermined opcodes, conditions, or events (such as particular faults), and to supply output signals indicative thereof. The detection circuits 300 detect and signal the existence of certain predetermined conditions that could lead to generation of uops which would then be inserted into the macroinstruction-generated uop stream. One implementation of the detection circuits 300 is discussed in detail with reference to FIG. 5.

The signals from the detection circuits 300 are supplied to inserted uop control logic 310, and responsive thereto, the inserted uop unit 221 may generate a forceuopvalid valid signal and a 5-bit encoded signal that control insertion of uops at any place between macroinstruction boundaries. For example, the inserted uop unit 221 may insert a uop before or after the uops generated by decoding a particular macroinstruction.

The detection circuits 300 can provide a wide variety of useful signals to the inserted uop control logic 310. In one implementation, the detection circuits 300 can be categorized in four classes: 1) pre-inserted uops, which are inserted before decoding any uops from the current instruction buffer, 2) post-insertion uops, in which all macroinstructions currently in the instruction buffer are decoded, and the uops are inserted subsequently, 3) code breakpoints in which uops are inserted before macroinstructions that have been flagged with a breakpoint, and 4) invalid macroinstructions that will not create any uops, in which case a uop flow is inserted in its place to signal this condition. Each of these classes is discussed elsewhere in detail, for example with reference to FIG. 5.

These classes all signify conditions or events that, although recognized early stages, cannot be acted upon until later processing by the back-end. For example, faults resulting from processing macroinstructions in the front-end cannot be signaled immediately at an early pipeline stage because the instruction stream that causes a given fault may not be on the path of certain execution and retirement due to speculative execution. In order to handle the fault at the appropriate time, a signal is generated to create an inserted uop sequence that marks the precise location of the fault. When and if this uop sequence retires the appropriate fault will be signaled.

Summary of the Inserted Uop Unit 221, and Implementation in a Decoder

As discussed above, there are times that the inserted uop unit 221 detects the existence of conditions that will lead to a generation of inserted uops. In response, the decoder generates inserted uops, forces them into the uop stream and issues them down the pipeline. Generation of special uops occurs in the decoder 224 responsive to the forceuopvalid valid signal asserted by the inserted uop unit and supplied to the input of the opcode decoders of the first decoder. In one embodiment, the opcode decoders comprise XLAT PLAs. When the forceuopvalid bit is set, the encoded bit pattern from the inserted uop unit 221 addresses into a predetermined section of the opcode decoder to supply a microcode flow predetermined for that encoded bit pattern. The inserted flow may be generated in one or more opcode decoders within the decoder 224, or it may be a flow requiring sequencing by the MS unit 226 in which case the decoder 224 provides the entry point to the MS unit 226. In one implementation, an inserted flow having up to four uops can be supplied from the opcode decoders in the decoder 224. A greater number requires sequencing by the MS unit 226. If the flow is complex, there may or may not be uops generated in the opcode decoders for the flow. In some instances an entire uop flow may reside in the UROM to save minterms in the PLAs.

As illustrated in the implementation of FIG. 3, the forceuopvalid signal controls a MUX 320 in one implementation. Another implementation is shown in FIG. 4. In FIG. 3, the MUX 320 receives a first input of macroinstruction opcodes and a second input of the encoded insert signal. The forceuopvalid signal controls which of these two signals is supplied for eventual decoding. Particularly, the forceuopvalid signal is applied to the MUX 320 to select between the opcodes and encoded inserted signal. The signal selected in the MUX 320 is supplied to the decoder 221 to provide a uop. If the encoded inserted signal is selected, then one or more uops may be issued which are inserted into the macroinstruction-generated uop flow through the decoder 221. The configuration illustrated, including the MUX 320, is provided for illustration purposes and as an aid to understanding the invention.

Figure 4:
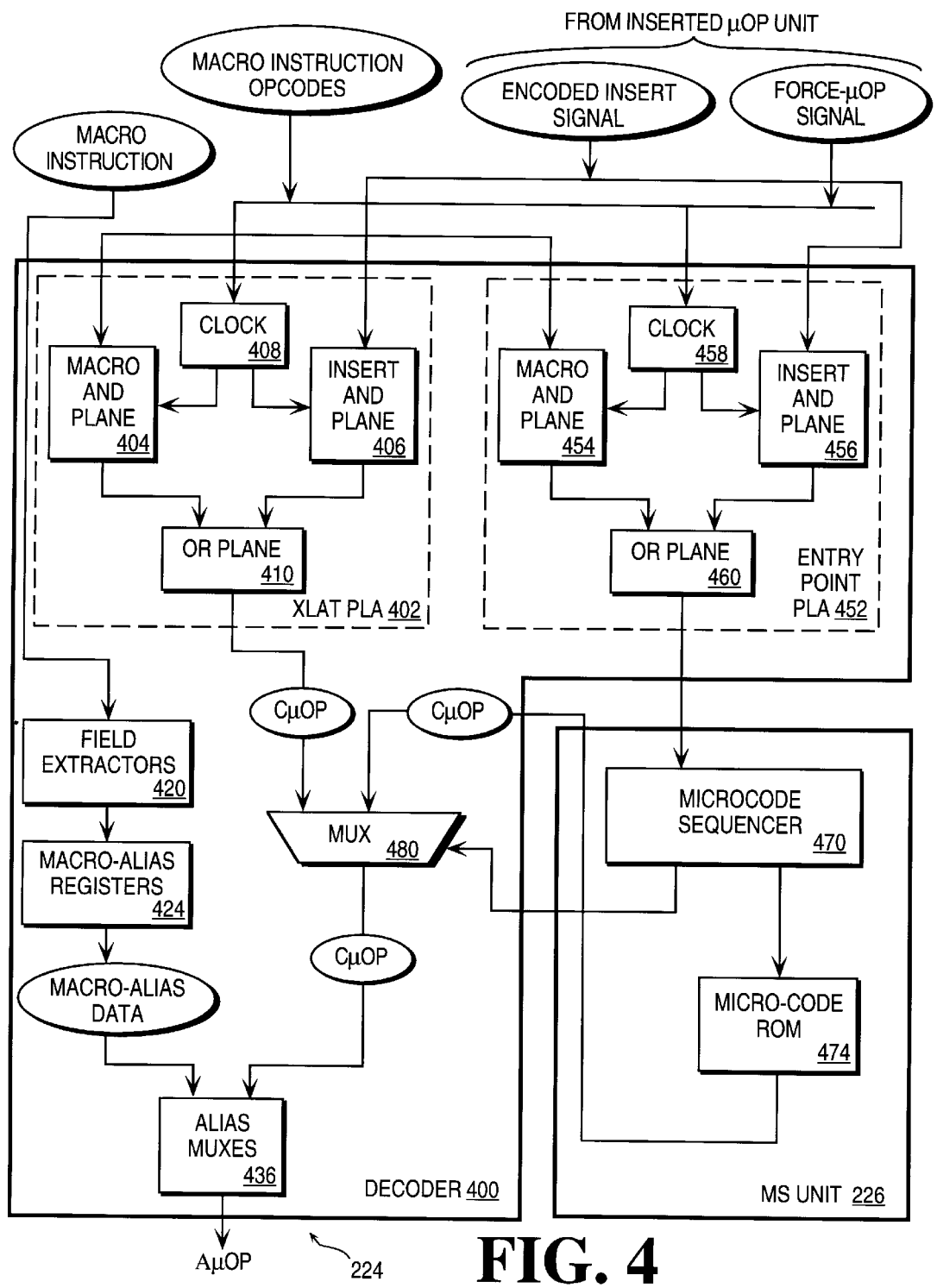
FIG. 4 is a block diagram of one implementation of a decoder and a microcode and microcode sequencer whose PLAs include two AND planes to increase processing speed.

Reference is now made to FIG. 4, which is a diagram of a decoder 400 in a preferred implementation of the decoder 224. The decoder 400 includes a translate programmable logic array ("XLAT PLA") 402 to receive predetermined opcodes from the macroinstruction and to produce intermediate uops at the output. In other words, the XLAT PLAT 402 is an opcode decoder.

Conventionally, XLAT PLAs include an AND plane and an OR plane. To implement logic in PLAs, logical operations are represented in a series of minterms that are computed in the AND plane and combined in the OR plane to provide an output.

The XLAT PLA 402 includes two AND planes: a macro AND plane 404 coupled to receive macroinstruction opcodes, and an insert AND plane 406 is coupled to the encoded insert signal to receive the encoded bit pattern therefrom. The forceuopvalid signal is applied to a dock 408 which selectively enables one of the micro AND plane 404 and the insert AND plane 406. The enabled output is supplied to the OR plane 410.

In the configuration of FIG. 4, the multiplexer 320 of FIG. 3 is not needed, because the clock configuration of FIG. 4 operates to selectively supply one of the opcodes and the encoded insert signal to make an intermediate uop. Advantageously, the implemented configuration of FIG. 4 does not include a multiplexer that obstructs the critical speed path to the decoder 224. Therefore, some embodiments of the configuration of FIG. 4 can operate faster than embodiments of FIG. 3.

The decoder 400 includes an aliasing system having field extractors 420 coupled to receive selected fields from a macroinstruction, and to supply macro-alias data 424. An exemplary aliasing system is described in U.S. Pat. No. 5,222,244 issued to Carbine et al. on Jun. 26, 1993. Generally, the field extractor 420 includes circuits to extract fields such as register specifiers from the operands and to steer them to macro-alias registers 424. The field extractor 420 extracts all aliasable information from the macrointruction in parallel with operation of the XLAT PLA 402. In one embodiment, the field extractor 420 includes detection circuits 300 to detect illegal operand usage, illegal prefixes, and/or macroinstructions that exceed the allowable length. One field extractor and aliasing system is described in detail in the commonly-assigned copending patent applications cross-referenced at the beginning of this application.

The intermediate uop generated in the XLAT PLA 402 may be termed a Control uop (abbreviated herein a "Cuop"). The Cuop is supplied to alias MUXes 436. The Cuops and macro-alias data extracted by the field extractor 420 are combined within the alias MUXes 436 to provide an assembled uop (termed herein an "Auop").

The decoder 400 includes an entry point PLA 452 configured like that of the XLAT PLA 402. The entry point PLA 452 includes a macro AND plane 454 coupled to receive predetermined macroinstruction opcodes and an insert AND plane 456 coupled to receive the encoded insert signal. A dock 458 is coupled to the forceuopvalid signal to clock one of the macro AND planes 454 and the insert AND plane 456, so that the forceuopvalid signal selects the output that is supplied to an OR plane 460. The output of the OR plane 460 is supplied to a microcode sequencer 470 within the MS unit 226. If the selected signal hits an entry point within the entry point PLA 452, then the microcode sequencer 470 begins the appropriate operations to access microcode ROM 474 and supply a stream of Cuops.

The Cuop provided by the microcode ROM 474 is provided to a MUX 480. A control signal MSBusy is generated by the microcode sequencer 470 whenever it issues microcode Cuops into the instruction flow. The MSBusy control signal operates by selecting one of the Cuops from the XLAT PLA 402 and a Cuop from the MS unit 226. The selected Cuop is supplied to the alias MUXes 430 and assembled with macro-alias data to provide an output Auop. One implementation of a MS unit 226 is described in detail in the related applications cross-referenced at the beginning of this application.

Implementation of the Detection Circuits 300

Figure 5:
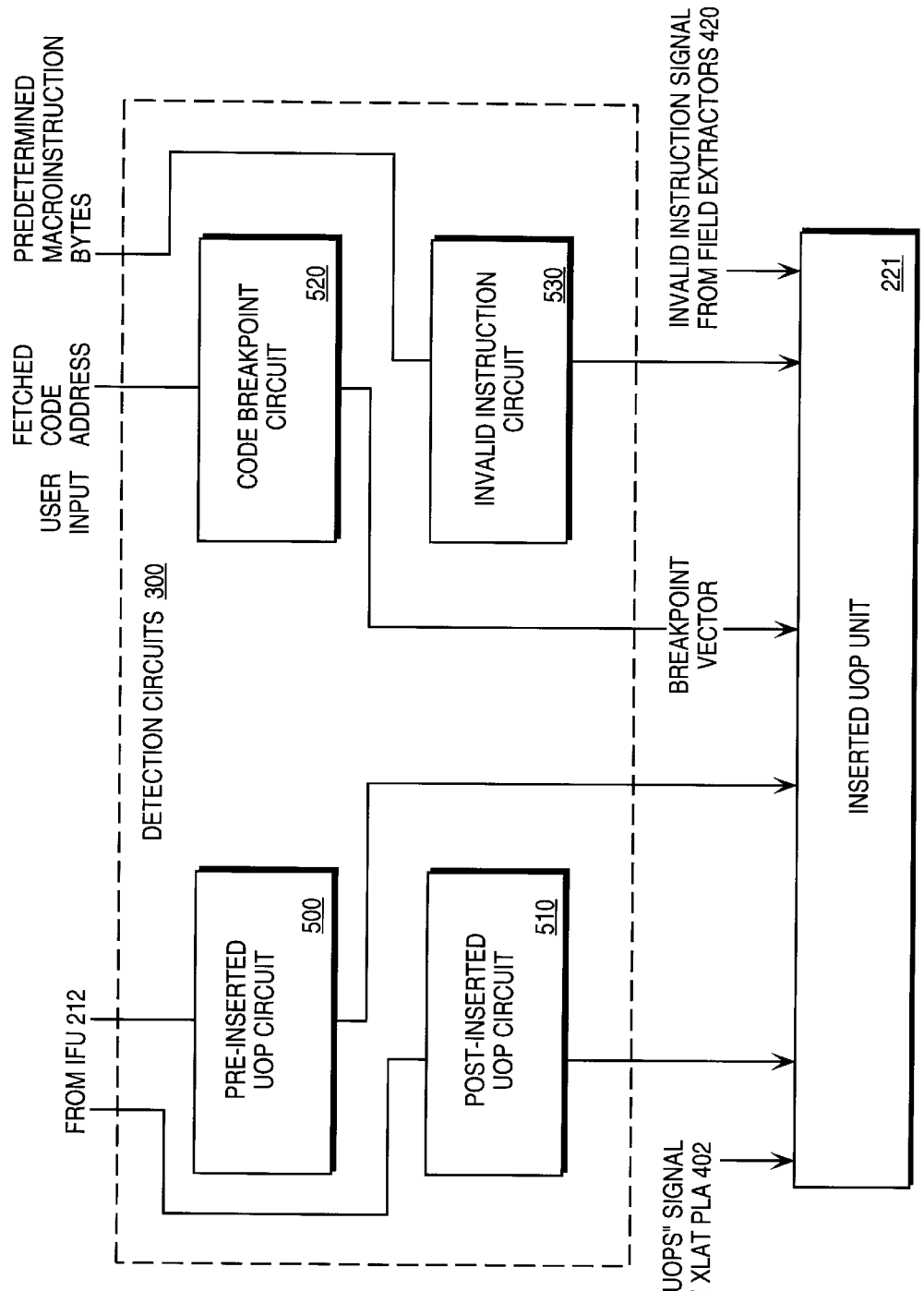
FIG. 5 is a block diagram of detection circuits in the processing system of one embodiment.

Reference is now made to FIG. 5, which illustrates one embodiment of the detection circuits 300. The blocks illustrated in FIG. 5 describe circuits which may actually be disposed in separate units. For example, one block may be in the IFU 212, and another block may reside partially within the IFU 212 and partially within the decoder 224. It should be understood that the blocks of FIG. 5 are provided for purposes of explaining the circuits that detect and generate control signals to be described.

Pre-Insertion and Post-Insertion Uops Generating IFU-Requested uops

In FIG. 5, a pre-inserted uop circuit 500 receives control signals from the IFU 212 and responsive thereto, signals if predetermined uops are to be inserted before a block of code in an instruction buffer. A post-inserted uop circuit 510 receives control signals from the IFU 212 (which may or may not be the same bytes supplied to the pre-inserted uop circuit 500), and responsive thereto, signals conditions in which predetermined uops are to be inserted after a block of code. These two classes of inserted uops—pre-inserted uops and post-inserted uops—are signaled in the IFU 212 responsive to predetermined conditions that sometimes occur while fetching instructions and supplying them to the decoder. Furthermore, each time a new batch of macro-instructions is loaded from the IFU 212 into an instruction buffer in the decoder 224, the inserted uop unit 221 also latches a signal from the IFU 212. If asserted, this signal indicates that the IFU 212 is requesting that the decoder 224 generate a special uop flow. For example, the IFU 212 can request a uop to be inserted in the event of a TLB ("Translated Lookaside Buffer") page miss. In addition, other instances may cause the IFU 212 to generate a special request. The IFU 212 can also signal whether the inserted flow is to be inserted before or after decoding all macroinstructions currently in the instruction buffer.

In summary, a special uop flow can be inserted before or after the macroinstruction-generated uop flow from all macroinstructions in the buffer that was loaded at the same time as the signal is latched from the IFU 212.

Generating uops to Support Code Breakpoints

In FIG. 5, a code breakpoint circuit 520 receives user input, such as from a keyboard, indicative of a desired code breakpoint location. The code breakpoint circuit 520 also receives the fetched code address. In some embodiments, the code breakpoint circuit 520 may be disposed in the IFU 212. Responsive to user-set breakpoints, the code breakpoint circuit 520 generates a 16-bit signal breakpoint vector when a specified code address is fetched from memory. Each bit of the breakpoint vector corresponds to one byte of the 16-byte macro-instruction buffer. The code breakpoint circuit 520 indicates a breakpoint by a set bit on a byte corresponding to the first byte of an instruction. User-set breakpoints on any other byte are ignored.

Responsive to a code breakpoint, the inserted uop unit 221 inserts a predetermined code breakpoint uop flow before decoding the corresponding macroinstruction at that code breakpoint, to trigger the code breakpoint event. Following that, the macroinstruction is re-decoded (since it was invalidated the first time) and the re-decoded uop flow is sent down the pipeline immediately following the code breakpoint uop flow.

Invalid Opcode Fault

In FIG. 5, an invalid instruction circuit 530 receives predetermined macroinstruction bytes from the instruction buffer 213, and tests them for invalid opcodes. Because an illegal opcode usually does not generate uops in the decoder 224, a uop flow to signal the invalid opcode fault is inserted in the space in the instruction flow where a uop flow would have been had it been valid.

An invalid opcode fault is generated responsive to at least the three following events: an invalid opcode, incorrect use of the LOCK prefix or invalid operands in a macroinstruction. Invalid opcode faults will be recognized only if they reach retirement. If not detected before reaching the decoder, an invalid opcode will be detected when an opcode presented to the decoder 224 does not map to a valid uop or to a reserved opcode. Incorrect use of the LOCK prefix ocurs when the LOCK prefix precedes an instruction that cannot be locked. Illegal use of the LOCK prefix is detected logic in the instruction decoder 224 that receives prefixes and detects legal uses of lock prefixes. If the logic does not detect that the use is legal, then it is determined to be illegal. The invalid operand condition occurs when an operand does not match the type of opcode with which it is associated.

The inserted uop unit 221 can detect invalid opcodes in at least two circuits in addition to the invalid instruction circuit 530. A first circuit is responsive to opcodes applied to the XLAT PLA 402 and the second circuit is responsive to fields supplied to the field extractors 420. The XLAT PLA 402 detects an invalid uop when a macro-instruction is steered to it but no valid Cuops are produced, which means that instruction must be illegal. The inserted uop unit 221 is coupled to detect this condition. However, valid Cuops could be produced by the decoder 400 even if the field extractors 420 detect an illegal register specifier or another condition that makes the instruction illegal. If the field extractors 420 detect one of such condition, an illegal opcode signal is communicated to the inserted uop unit 221 and the associated Cuops generated by the XLAT PLA 402 must be invalidated.

After detecting the illegal opcode the inserted uop unit 221 asserts the forceuopvalid signal on the next clock and forces the appropriate vector into the decoder 400 to generate an invalid opcode uop flow. If the uops of this flow reach retirement then an invalid opcode fault occurs. If the uops are inserted in a mispredicted path, then they will eventually be flushed before retiring and thus no fault will be generated.

One example of an invalid instruction is one that is too long. Instructions that exceed the fifteen byte instruction length limit cause a general protection fault even if the opcodes are valid. For example, a general protection fault could occur when the opcodes are preceded by redundant prefix bytes or more than one prefix of a single prefix type (e.g., more than one segment override prefix).

From the above description, it will be apparent that the invention disclosed herein provides a novel and advantageous system for inserting micro-operations. As will be understood by those familiar with the art, the invention may be embodied in other specific forms without departing from its spirit or essential characteristics, and thus, the described embodiment is not restrictive of the scope of the invention.

The following claims are indicative of the scope of the invention, and all variations which come within the meaning and range of equivalency of the claims are to be embraced within their scope.

What is claimed is:

1. In a processor having a decoder for receiving and decoding macroinstructions into a uop flow and an execution unit for receiving and executing said uop flow, a mechanism for inserting a uop sequence into said uop flow, comprising:

a detection circuit, responsive to predetermined uop-insertion events for generating a control signal indicative thereof;

inserted uop control logic responsive to said control signal for generating an insert signal and an encoded signal indicative of a predetermined inserted uop sequence;

circuitry in said decoder, responsive to said insert signal and said encoded signal, for decoding said encoded signal to provide said inserted uop sequence, and inserting said inserted uop sequence into said uop flow; and wherein said decoder comprises:
  a first AND plane coupled to receive opcodes from said macroinstructions;
  a second AND plane coupled to receive said encoded signal;
  a clock responsive to said insert signal for clocking one of said first and second AND planes; and
  an OR plane coupled to said first and second AND planes.

2. The uop insertion mechanism of claim 1 further comprising:

a pre-insertion detection circuit for detecting said uop-inserting event during fetching a block of macroinstructions into an instruction buffer; and said inserted uop control logic includes a circuit, responsive to said pre-insertion detection circuit, for inserting said uop sequence before the uop flow generated by any of said macroinstructions in said instruction buffer.

3. The uop insertion mechanism of claim 1 further comprising:

a post-insertion detection circuit for detecting said uop-inserting event during fetching a block of macroinstructions into an instruction buffer; and said inserted uop control logic includes a circuit, responsive to said post-insertion detection circuit, for inserting said uop sequence after the uop flow generated by said macroinstructions in said instruction buffer.

4. The uop insertion mechanism of claim 1 further comprising:

a code breakpoint detection circuit responsive to a user-set breakpoint for detecting a breakpoint address in fetched code that corresponds to said user-set breakpoint; and said inserted uop control logic includes a circuit, responsive to said code breakpoint detection circuit, for inserting said uop sequence before the uop flow generated by the macroinstruction at said breakpoint address.

5. The uop insertion mechanism of claim 1 further comprising:

an invalid macroinstruction detection circuit for detecting an invalid macroinstruction; and said inserted uop control logic includes a circuit, responsive to said invalid macroinstruction detection circuit, for inserting said uop sequence where the uop flow would have been generated by a detected macroinstruction.

6. A method of inserting a uop sequence into a macroinstruction-generated uop flow, comprising the steps of:

a. decoding a macro-instruction sequence in a decoder into a macroinstruction-generated uop flow;

b. detecting a uop-inserting event and generating a control signal responsive thereto;

c. responsive to said control signal, supplying an forceuopvalid signal and an encoded signal indicative of a predetermined inserted uop sequence;

d. decoding said encoded signal to provide said inserted uop sequence; and e. inserting said inserted uop sequence into said macroinstruction-generated uop flow.

7. The method of inserting a uop sequence of claim 6, wherein:

in said step (b), said uop-inserting event is detected during fetching a block of macroinstructions into an instruction buffer; and said step (e) includes inserting said inserted uop sequence into said macroinstruction-generated uop flow before the uop flow generated by said block of macroinstructions in said instruction buffer.

8. The method of inserting a uop sequence of claim 6, wherein:

in said step (b), said uop-inserting event is detected during fetching a block of macroinstructions into an instruction buffer; and said step (e) includes inserting said inserted uop sequence into said macroinstruction-generated uop flow after the uop flow generated by said block of macroinstructions in said instruction buffer.

9. The method of inserting a uop sequence of claim 6, wherein:

in said step (b), said uop-inserting event is a code breakpoint; and said step (e), includes inserting said inserted uop sequence into said macroinstruction-generated uop flow before the uop flow that activates said code breakpoint.

10. The method of inserting a uop sequence of claim 6, wherein:

in said step (b), said uop-inserting event is a fault indicating an invalid macroinstruction; and said step (e), includes inserting said inserted uop sequence into said macroinstruction-generated uop flow in place of the uop flow that would have been generated by said invalid macroinstruction.

11. A method of inserting a uop sequence into a macroinstruction-generated uop flow, comprising the steps of:

a. decoding a macro-instruction sequence in a decoder into a macroinstruction-generated uop flow;

b. detecting a uop-inserting event during fetching a block of macroinstructions into an instruction buffer and generating a control signal responsive thereto;

c. responsive to said control signal, supplying an forceuopvalid signal and an encoded signal indicative of a predetermined inserted uop sequence;

d. decoding said encoded signal to provide said inserted uop sequence; and e. inserting said inserted uop sequence into said macroinstruction-generated uop flow before the uop flow generated by said block of macroinstructions in said instruction buffer.

12. A method of inserting a uop sequence into a macroinstruction-generated uop flow, comprising the steps of:
   a. decoding a macro-instruction sequence in a decoder into a macroinstruction-generated uop flow;
   b. detecting a uop-inserting event during fetching a block of macroinstructions into an instruction buffer and generating a control signal responsive thereto;
   c. responsive to said control signal, supplying an forceuopvalid signal and an encoded signal indicative of a predetermined inserted uop sequence;
   d. decoding said encoded signal to provide said inserted uop sequence; and
   e. inserting said inserted uop sequence into said macroinstruction-generated uop flow after the uop flow generated by said block of macroinstructions in said instruction buffer.

13. A method of inserting a uop sequence into a macroinstruction-generated uop flow, comprising the steps of:
   a. decoding a macro-instruction sequence in a decoder into a macroinstruction-generated uop flow;
   b. detecting a code breakpoint and generating a control signal responsive thereto;
   c. responsive to said control signal, supplying an forceuopvalid signal and an encoded signal indicative of a predetermined inserted uop sequence;
   d. decoding said encoded signal to provide said inserted uop sequence; and
   e. inserting said inserted uop sequence into said macroinstruction-generated uop flow before the uop flow that activates said code breakpoint.

14. A method of inserting a uop sequence into a macroinstruction-generated uop flow, comprising the steps of:
   a. decoding a macro-instruction sequence in a decoder into a macroinstruction-generated uop flow;
   b. detecting a fault indicating an invalid macroinstruction and generating a control signal responsive thereto;
   c. responsive to said control signal, supplying an forceuopvalid signal and an encoded signal indicative of a predetermined inserted uop sequence;
   d. decoding said encoded signal to provide said inserted uop sequence; and
   e. inserting said inserted uop sequence into said macroinstruction-generated uop flow in place of the uop flow that would have been generated by said invalid macroinstruction.

* * * * *